J. M. MERRITT.
CARRIER.
APPLICATION FILED AUG. 20, 1917.
1,271,054.
Patented July 2, 1918.
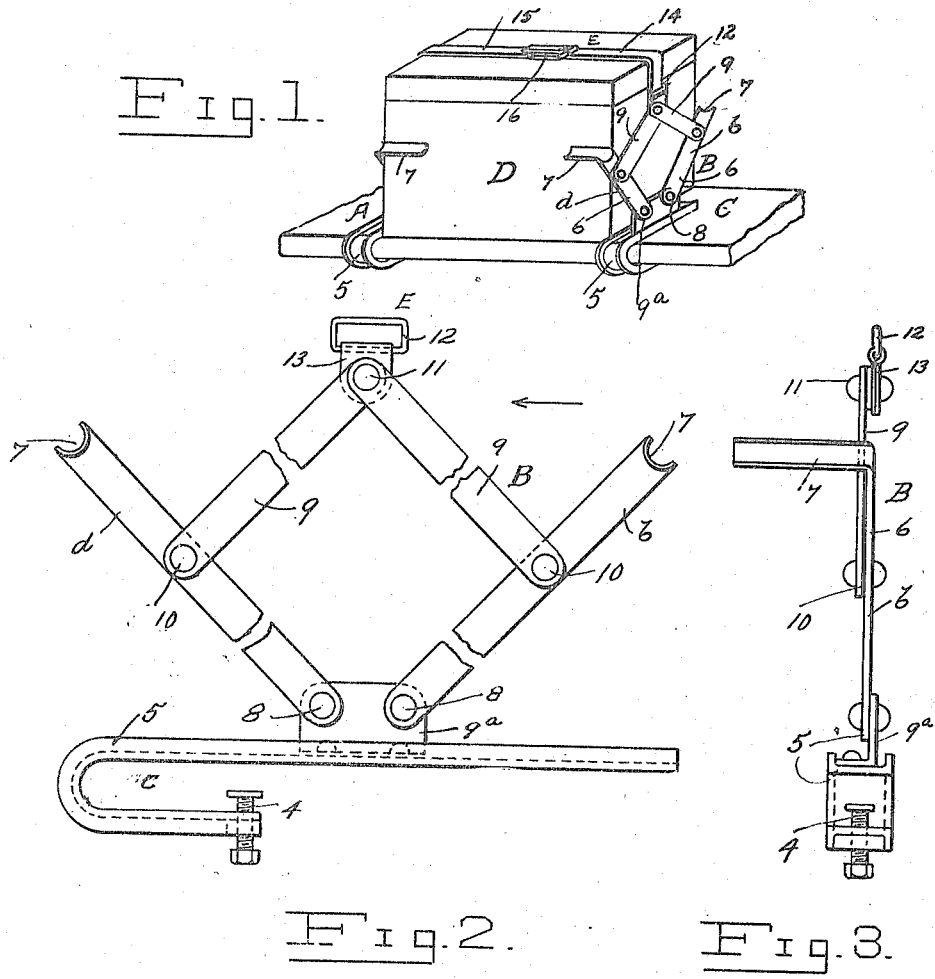

UNITED STATES PATENT OFFICE.

JAMES M. MERRITT, OF LOS ANGELES, CALIFORNIA, ASSIGNOR TO BOYLE MANUFACTURING COMPANY, OF LOS ANGELES, CALIFORNIA, A CORPORATION OF CALIFORNIA.

CARRIER.

1,271,054.  Specification of Letters Patent.  Patented July 2, 1918.

Application filed August 29, 1917. Serial No. 187,220.

*To all whom it may concern:*

Be it known that I, JAMES M. MERRITT, a citizen of the United States, residing at Los Angeles, in the county of Los Angeles and State of California, have invented new and useful Improvements in Carriers, of which the following is a specification.

This invention relates to carriers, and more particularly to carriers adapted to be combined and used with vehicles, as with the running boards of motor vehicles, for the purpose of transporting boxes, canteens, bags, and other containers and objects, and by means of which such things may be conveniently and securely fastened in position for transportation. The invention has as a particular object the provision of an improved carrier of the general character mentioned, which will readily adapt or fit itself to objects of varying shape and bulk or mass, and which may likewise be readily attached to and removed from the running board or other portion of the vehicle.

The invention has for a further object the provision of an improved carrier of the general character stated, which will be superior in point of relative simplicity and inexpensiveness of construction, compactness in form, and durability, and which will be generally superior in efficiency and serviceability. With the above and other objects in view, the invention consists in a novel and useful provision, formation, construction, combination and inter-relation and mode of application of parts, members and features, all as hereinafter described, shown in the drawing, and finally pointed out in claims.

In the drawing:

Figure 1 is an isometric view of a carrier constructed and organized to embody the invention, the same being shown as applied to a portion of a running board of a motor vehicle;

Fig. 2 is an enlarged detail fragmentary view of one member of such carrier in detached position; and, Fig. 3 is an edge view of the construction shown in Fig. 2, looking in the direction of the arrow in that figure.

Corresponding parts in all of the figures are designated by the same reference characters.

Referring with particularity to the drawing, A and B designate like members of a carrier shown as applied to a portion of a running board C of a motor vehicle, and, in Fig. 1, as applied likewise to an object D, such as a box, which rests upon the running board C, so as to hold such object firmly and securely to and upon the running board for transportation. E designates a retaining member extending between the members A and B and adapted to be secured over the box or other object D, thus coöperating with the members A and B in holding the object D in place.

The members A and B are similar in construction, but are so formed as to be applied to the object, such as D, in oppositely facing directions, as clearly indicated in Fig. 1, and each of the same comprises an attaching element $c$ which is directly applied to the running board C and is provided preferably with a suitable securing device, such as a cap screw, 4, which is brought to bear directly upon the running board, preferably beneath the same, to firmly bind the attaching element $c$ to the running board, such attaching device preferably including a hooked or curved bar 5 overlapping one edge of the running board and so embracing the latter. Each member A and B further preferably includes load-engaging elements or members $b$ and $d$, each of which may comprise a straight shank portion 6 terminating in an angularly directed head or outer end portion 7, between both of which heads 7 the box or other object D is embraced. The shanks 6 are preferably connected, either jointly, or as shown, preferably separately, as at 8, with a head or bracket $9^a$ rising from the bar 5 of the attaching element $c$. From each such shank 6 and intermediate its pivotal point 8 and its head 7 extends a link 9, pivoted to such shank, as at 10, such links 9 being jointly pivotally connected at their outer ends, as at 11, with a part of the member E above referred to and which may consist of a loop or eye 12 provided with an ear or bracket 13, at which latter such pivotal point 11 is directly provided.

The carrier member E may consist of two straps, 14 and 15, each of which is connected at one of its ends with one loop or eye 12, the free end of one of said straps, 15, being provided with a buckle device 16, and the free end of the other strap, 14, being suitably formed to coöperate with said buckle device.

The operation, method of use and advantages, together with the mode of application and adjustment, of a carrier embodying the invention and of the parts and features and elements thereof, will be readily understood from the foregoing description, taken in connection with the accompanying drawing, and the following statement:

The members A and B are readily applied to the running board C by fitting the hooked or bent bar 5 of the attaching elements c to such running board, so as to embrace the same, and so spaced apart as to properly accommodate the object to be held to the running board, considering its size and shape. When so fitted and relatively adjusted, the securing devices or screws 4 are brought to bear beneath the running board, fixing such members A and B in working positions. The toggle elements of the members A and B, comprising each of the shanks 6 and links 9 with their pivotal supports and connections, are then manipulated or operated so as to bring the heads 7 of the load-engaging elements b and d into gripping engagement with the load or object D, and this may be done by applying the free end of the strap 14 to the buckle 16 and tightening the straps 14 and 15 down over the load, or the members A and B may be otherwise operated to produce the result stated, and the straps 14 and 15 then co-adjusted to maintain the heads 7 firmly in engagement with the load and likewise to hold the load down firmly upon the running board. Likewise, with the parts so applied, and adjusted, the load D will be not only held by the heads 7 against displacement in two directions, and by the straps and running board against displacement in two other directions, but will be held by the attaching elements 5 and the shank 6 and links 9 and brackets 9ª against displacement in the two remaining directions, the load of object D thus being positively and unfailingly held in position upon the running board for transportation.

It will be noted that the members A and B automatically adjust themselves to properly fit and accommodate loads of varying shapes and sizes, and that the toggle action of the parts and features thereof, as above referred to, produces a strong effective grip upon the load or object, reliably and positively maintaining it in position upon the running board, with the coöperation of the other features and elements.

Also, as stated, the members A and B may be relatively adjusted along the running board to assist such accommodation of objects of varying sizes and shapes, and when so adjusted may be firmly secured in positions of adjustment by the securing devices 4, by the aid of a suitable wrench or other device.

Thus, while of simple and few parts, the device has a wide range of adaptability and utility, or versatility of performance, at the same time performing its service effectively and without liability to breakage or derangement of the parts and features. It may likewise be applied and removed quickly and easily, and the adjustment and operation of its parts and features is performed with extreme simplicity and convenience and a minimum expenditure of time.

It is manifest that many variations and departures in construction, formation, combination, mode of application and method of use of parts, members and features of the carrier may be made without departure from the spirit of the invention and a fair interpretation thereof.

Having thus disclosed my invention, I claim and desire to secure by Letters Patent:

1. An improved carrier, comprising a pair of toggle devices provided each with separate load-engaging portions, means for attaching each of said toggle devices to a support, and means coöperating with and connecting said toggle devices to hold said load-engaging portions against the load, and to hold said load upon the support; each of said toggle devices and its attaching element comprising a part adapted to be directly applied to and secured to a vehicle running board or the like, shanks pivotally connected with said part and provided with heads angularly directed from the shanks, and links pivotally connected with said shanks; and said means for connecting said devices comprising flexible load-engaging and securing means with which said links are pivotally connected.

2. An improved carrier, comprising a pair of toggle devices provided each with separate load-engaging portions, means for relatively adjustably attaching each of said toggle devices to a support, and means coöperating with said toggle devices to hold said load-engaging portions against the load, and to hold said load upon the support; each of said toggle devices and its attaching element comprising a part adapted to be directly applied to and secured to a vehicle running board or the like, shanks pivotally connected with said part and provided with heads angularly directed from the shanks, and links pivotally connected with said shanks; and said connecting means comprising a flexible load-engaging and securing member with which said links are pivotally connected.

3. A carrier of the character disclosed, comprising independent attaching members adapted to be relatively adjustably mounted upon a load support, load-engaging members pivotally connected with each of said attaching members and adapted to embrace and hold a load upon said support, links pivotally connected with one another and the members on each attaching member, and a flexible element detachably connected with the links and tending to hold the load-engaging members in operative position and the load upon the support.

4. A carrier of the character disclosed, comprising independent attaching members adapted to be relatively adjustably mounted upon a load support, load-engaging members pivotally connected with each of said attaching members and adapted to embrace and hold a load upon said support, connections between the load-engaging members on each attaching member and a connection detachably secured to said connections and tending to hold the load-engaging members in operative position so that the load is held upon the support.

5. A carrier of the character disclosed, comprising attaching members adapted to be mounted upon a load support, load-engaging members pivotally connected with each of said attaching members and adapted to embrace and hold a load upon said support, connections between the load-engaging members on each attaching member, and a connection detachably secured to said connections and tending to hold the load-engaging members in operative position so that the load is held upon the support.

In testimony whereof, I have signed my name to this specification in the presence of two subscribing witnesses.

JAMES M. MERRITT.

Witnesses:
 JOHN E. GILLOOLY,
 DANIEL P. O'KEEFE.